(12) United States Patent
Hosaka et al.

(10) Patent No.: US 7,589,771 B2
(45) Date of Patent: Sep. 15, 2009

(54) IMAGE PROCESSING APPARATUS, IMAGE PROCESSING METHOD, IMAGE PICKUP APPARATUS, COMPUTER PROGRAM AND RECORDING MEDIUM

(75) Inventors: Hajime Hosaka, Kanagawa (JP); Masanori Kasai, Kanagawa (JP)

(73) Assignee: Sony Corporation, Tokyo (JP)

( * ) Notice: Subject to any disclaimer, the term of this patent is extended or adjusted under 35 U.S.C. 154(b) by 644 days.

(21) Appl. No.: 11/304,651

(22) Filed: Dec. 16, 2005

(65) Prior Publication Data
US 2006/0132642 A1 Jun. 22, 2006

(30) Foreign Application Priority Data
Dec. 22, 2004 (JP) ............... P2004-371985

(51) Int. Cl.
*H04N 5/208* (2006.01)
*G06K 9/40* (2006.01)
(52) U.S. Cl. ............... 348/252; 382/266; 382/269
(58) Field of Classification Search ............ 348/208.1, 348/215.1, 252, 222.1; 382/266, 264, 269
See application file for complete search history.

(56) References Cited

U.S. PATENT DOCUMENTS

| | | | | |
|---|---|---|---|---|
| 4,249,797 A | * | 2/1981 | Sendecki | 359/629 |
| 4,910,593 A | * | 3/1990 | Weil | 348/164 |
| 5,420,633 A | * | 5/1995 | Matoba | 348/242 |
| 5,902,348 A | * | 5/1999 | Okamoto et al. | 701/201 |
| 6,882,364 B1 | * | 4/2005 | Inuiya et al. | 348/252 |
| 7,061,000 B2 | * | 6/2006 | Matama | 250/559.45 |
| 7,409,083 B2 | * | 8/2008 | Yano | 382/166 |
| 2004/0028271 A1 | * | 2/2004 | Pollard et al. | 382/162 |
| 2006/0054782 A1 | * | 3/2006 | Olsen et al. | 250/208.1 |
| 2006/0072171 A1 | * | 4/2006 | Nystrom et al. | 358/514 |

FOREIGN PATENT DOCUMENTS

| | | | |
|---|---|---|---|
| EP | 1 453 301 A1 | * | 9/2004 |
| JP | 2004-289829 | | 10/2004 |
| JP | 2004-318425 | | 11/2004 |

OTHER PUBLICATIONS

Petschnigg et al., "Digital Photography with Flash and No-Flash Image Pairs", acm Translation on Graphics, vol. 23, No. 3, pp. 664-672, Aug. 2004.

* cited by examiner

*Primary Examiner*—Tuan V Ho
*Assistant Examiner*—Euel K Cowan
(74) *Attorney, Agent, or Firm*—Finnegan, Henderson, Farabow, Garrett and Dunner, L.L.P.

(57) ABSTRACT

Noises are reduced in an image picked up in natural light without using lighting equipment that affect the picked up image. The present invention provides an image processing apparatus that includes an image acquisition unit that acquires a visible light image and an invisible light image corresponding to the visible light image, and a noise reduction unit that reduces noises of the visible light image by using the invisible light image.

13 Claims, 12 Drawing Sheets

IMAGE PROCESSING APPARATUS, IMAGE PROCESSING METHOD, IMAGE PICKUP APPARATUS, COMPUTER PROGRAM AND RECORDING MEDIUM

CROSS REFERENCES TO RELATED APPLICATIONS

The present invention contains subject matter related to Japanese Patent Application JP 2004-371985 filed in the Japanese Patent Office on Dec. 22, 2004, the entire contents of which being incorporated herein by reference.

BACKGROUND OF THE INVENTION

1. Field of the Invention

This invention relates to an image processing apparatus, image processing method, an image pickup apparatus, a computer program and a recording medium adapted to eliminate noises, while storing edges of images.

2. Description of the Related Art

When an image is picked up by a camera, the color tone of the image depends on lighting to a large extent. For example, the picked up image of a subject bears an orangey color tone when the subject is irradiated with candle light but bears a bluish color tone when it is irradiated with moon light. Images of a subject may be picked up with completely different color tones on the same site depending on lighting.

When picking up an image, it is possible to correctly reproduce the original color tone by utilizing natural light without using lighting equipment such as a flash bulb. However, the picked up image contains noises to a considerable extent when the subject is shot indoors or at night because of insufficient exposure to light. When, on the other hand, flash light is used for imaging, the edges of the objects and other details in the picked up image appear clearly but the color tone of the image may not be accurate and/or shades and high lights that do not actually exist may also appear.

An image processing apparatus as illustrated in FIG. 1 of the accompanying drawings has been proposed to dissolve the above-identified problem. Referring to FIG. 1, the image processing apparatus 11 includes a pair of low pass filters 12, 13, a high pass filter 14, a pair of image synthesizing sections 15, 17 and a single shadow extracting section 16.

The low pass filter 13 is a cross bilateral filter that detects edges from an image picked up by using flash light (to be referred to as flash image hereinafter) and remove noises from an image picked up without using flash light (to be referred to as natural light image hereinafter). The high pass filter 14 extracts edges of objects in the picked up image. For extracting edges, the image processing apparatus executes a process of dividing each pixel value in the natural light image by the corresponding one of the flash image.

The image synthesizing section 15 synthetically combines the natural light image from which noises are removed by the low pass filter 13 and the flash image from which edges are extracted by the high pass filter 14 to generate a synthetic image Comp. For synthesizing an image, the image processing apparatus executes a process of multiplying each pixel value of the low pass filter 13 by the corresponding one of the output image of the high pass filter 14. The synthetic image Comp provides the advantages of the flash image and those of the natural light image so that its color tone is accurate and it contains fewer noises.

The low pass filter 12 removes noises from the natural light image. A bilateral filter is used for the low pass filter 12. A bilateral filter can detect edges and remove noises from a single image.

The shadow extracting section 16 extracts differences between the two images including the flash image and the natural light image and evaluates the probability by which the flash image is changed from the natural light image by high lights and shadows. The image synthesizing section 17 carries out an operation of weighted addition of the output image from the low pass filter 12 and the output image Comp of the image synthesizing section 15 according to the outcome of the evaluation of the shadow extracting section 16. More specifically, the image synthesizing section 17 raises the weight of the image in a part thereof where shadows and high lights may highly probably have been produced by flash light and reduces the weight of the image in a part hereof where they may probably have not been produced. On the other hand, the image synthesizing section 17 removes unnecessary shadows and high lights from the synthetic image Comp and generates an output image Out.

As described above, the known image processing apparatus 11 can obtain an image where edges in a flash image and the color tone of a corresponding natural light image are optimally blended by generating two images including an image where edges are synthesized from a flash image and an image from which noises are removed without referring to the edges of the flash image, raising the coefficient of the output image of the high pass filter 12 for pixels where shadows and high lights may highly probably have been produced by flash light and reducing the coefficient of the output image Comp of the image synthesizing section 17 for pixels where shadows and high lights may probably have not been produced (see, for example, Non-Patent Document 1: Georg Petschnigg et al, Digital Photography with Flash and No-Flash Image pairs, acm Transaction on Graphics, Vol. 23, Number 3, pp. 664-672, August 2004).

SUMMARY OF THE INVENTION

While edges and details of an image become clear when flash light is used for picking up the image, shadows and high lights that do not exist in a corresponding natural light image can appear as described above. Although it is desirable for the image processing apparatus 11 to leave edges and details in the image, while removing shadows and high lights, it is not easy to discriminate them from each other. In other words, it costs a lot to discriminate them from each other by way of computations.

Additionally, the image processing apparatus 11 requires two images including a flash image and a natural light image. Since it is not possible to pick up a flash image and a natural light image at the same time, the technique of obtaining two images cannot be applied to moving pictures and to operations of picking up a moving subject. Still additionally, it is not possible to obtain a flash image in areas where the use of flashlight is prohibited.

In view of the above identified problems, it is therefore desirable to provide an image processing apparatus, an image processing method, an image pickup apparatus, a computer program and a recording medium that can reduce noises in an image picked up in natural light without using lighting equipment that affect the picked up image.

According to the present invention, there is provided an image processing apparatus including: an image acquisition means for acquiring a visible light image and an invisible light image corresponding to the visible light image; and a noise reduction means for reducing noises of the visible light image by using the invisible light image.

According to the present invention, there is also provided an image pickup apparatus including: a visible light image pickup means for picking up a visible light image according to a first spectral characteristic of having sensitivity mainly relative to visible light; an invisible light image pickup means for picking up an invisible light image according to a second spectral characteristic of having sensitivity mainly to invisible light; an aberration correction means for correcting the aberration of the visible light image and that of the invisible light image; and a noise reduction means for reducing noises of the visible light image by using the invisible light image.

According to the present invention, there is also provided an image processing method including: an image acquisition step of acquiring a visible light image and an invisible light image corresponding to the visible light image and picked up with the same number of pixel as those of the visible light image; and a noise reduction step of reducing noises of the visible light image by using the invisible light image.

According to the present invention, there is also provided a computer program for causing a computer to execute a predetermined process, the program including: an image acquisition step of acquiring a visible light image and an invisible light image corresponding to the visible light image and picked up with the same number of pixel as those of the visible light image; and a noise reduction step of reducing noises of the visible light image by using the invisible light image.

According to the present invention, there is also provided a recording medium where a computer program for causing a computer to execute a predetermined process, the program including: an image acquisition step of acquiring a visible light image and an invisible light image corresponding to the visible light image and picked up with the same number of pixel as those of the visible light image; and a noise reduction step of reducing noises of the visible light image by using the invisible light image.

Thus, according to the present invention, it is possible to reduce noises in an image picked up in natural light without using lighting equipment that affect the picked up image because noises are reduced from an invisible light image by using a corresponding visible light image.

DETAILED DESCRIPTION OF THE PREFERRED EMBODIMENTS

Figure 1:
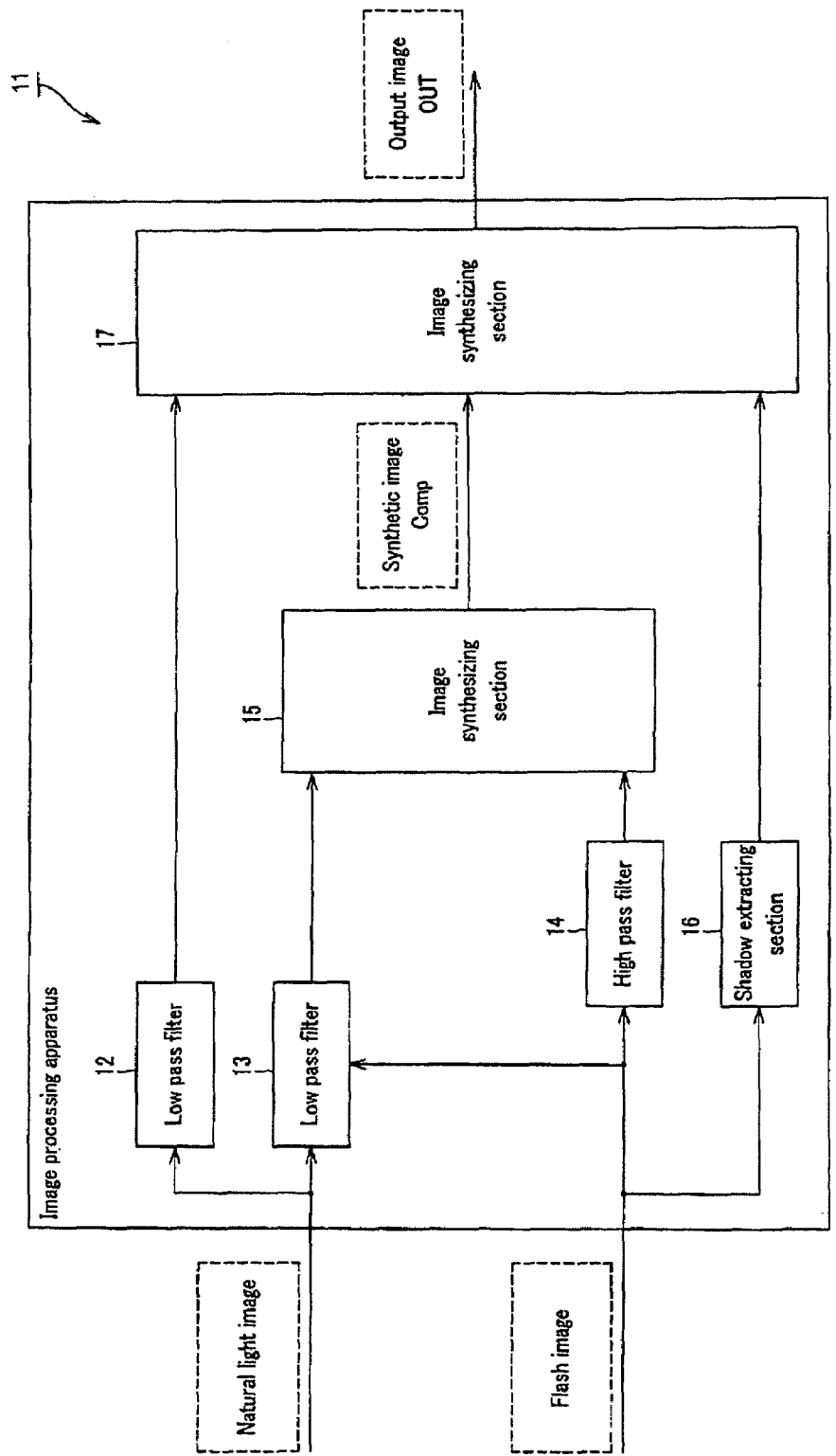
FIG. 1 is a schematic block diagram of a known image processing apparatus.
Figure 2:
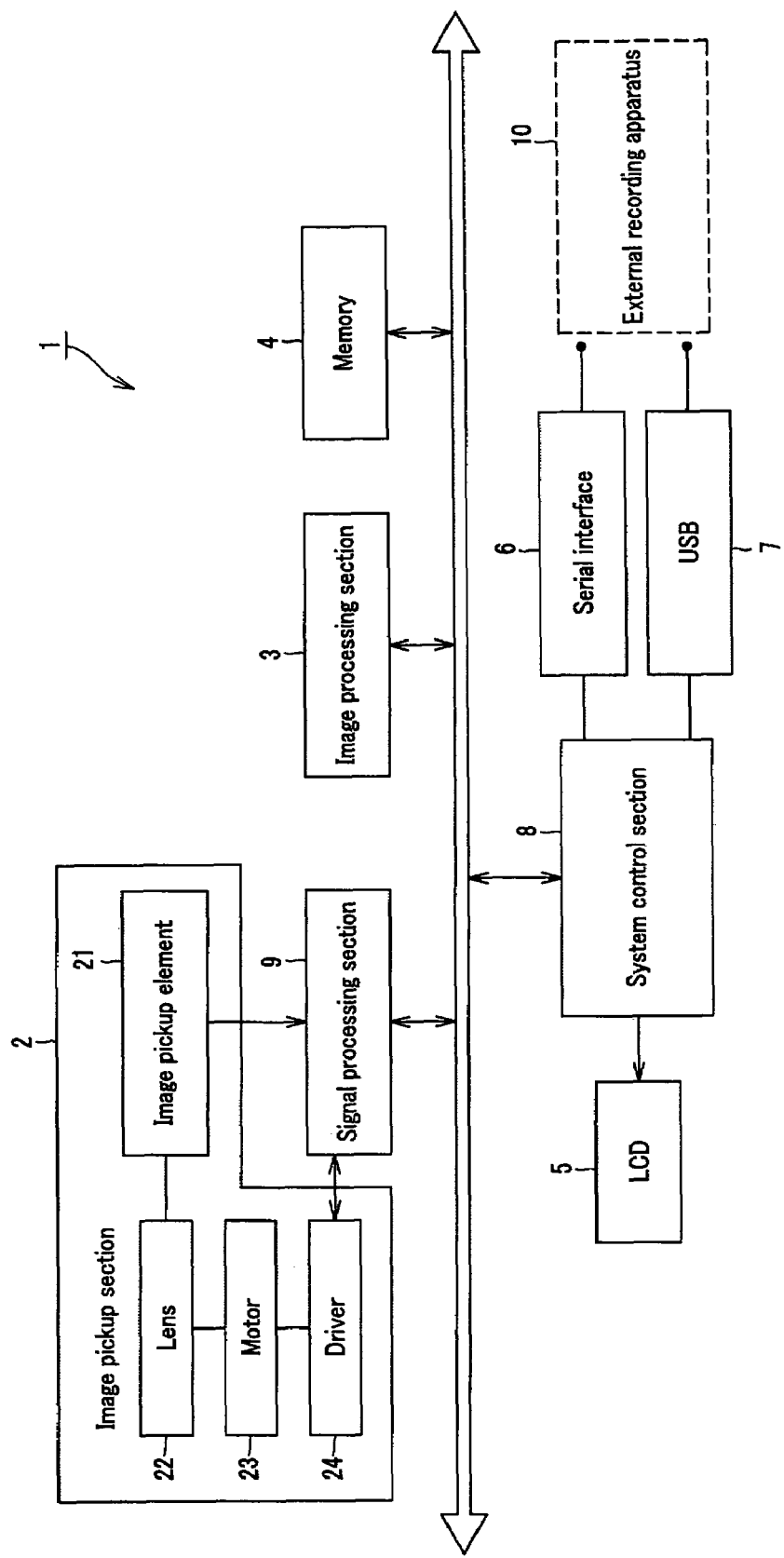
FIG. 2 is a schematic block diagram showing the configuration of an embodiment of image pickup apparatus.

Now an embodiment of image pickup apparatus of the present invention will be described below by referring to the related drawings. FIG. 2 is a schematic block diagram showing the configuration of the embodiment of image pickup apparatus. Referring to FIG. 2, the image pickup apparatus 1 includes an image pickup section 2 for picking up both a visible light image Visible and an infrared image Infr at a time, an image processing section 3 for removing noises from the visible light image Visible, a memory 4 for providing storage area for storing images and data, a system control section 8 adapted to output images to LCD (liquid crystal display) 5 and exchange data with external recording apparatus 10 by way of interfaces such as serial interface 6 and USB (universal serial bus) 7 and a signal processing section 9 adapted to operate for AGC (automatic gain control) and CDS (correlated double sampling) on the image input from image pickup element 21 and output the image to the image processing section 3.

The image pickup section 2 outputs RGB images including a visible light image Visible and an infrared image Infr. The image pickup section 2 includes an image pickup element 21 typically formed by using a CCD (charge coupled device) and a CMOS (complementary Metal-Oxide Semiconductor), a motor 23 for focusing lens 22 and switching the shutter speed 23 and a driver 24 for controlling the motor 23.

The image pickup element 21 may include two image pickup elements 21 including one that operates for picking up an infrared image Infr and one that operate for picking up a visible light image Visible. The image pickup element 21 for picking up an infrared image Infr and the image pickup element 21 for picking up a visible light image Visible have a same number of pixels and a same view angle and are adapted to be exposed to light simultaneously for a same period of time. Alternatively, it may be so arranged that the output of a single image pickup element 21 is used for both an infrared image Infr and a visible light image Visible.

Figure 3:
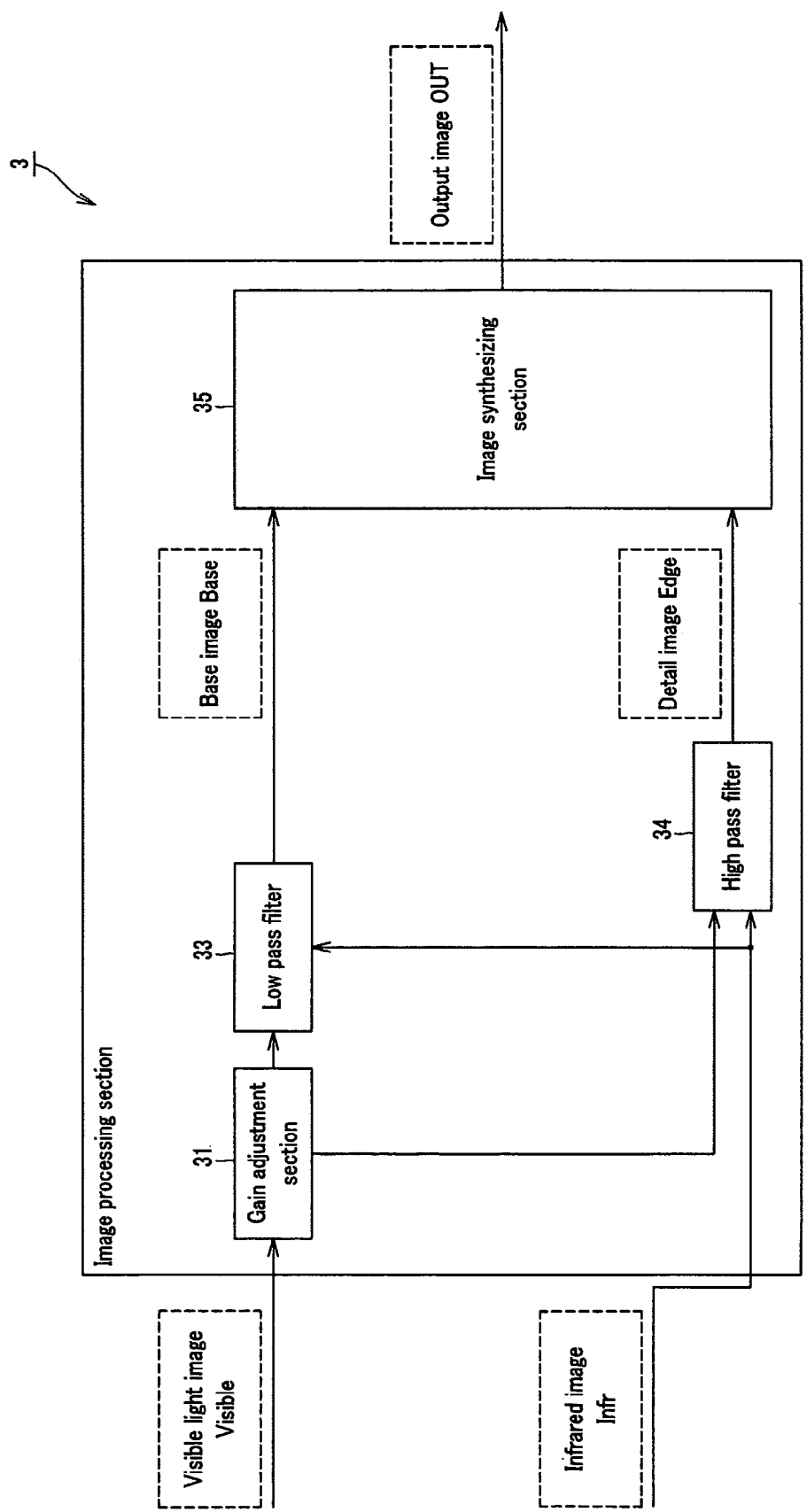
FIG. 3 is a schematic block diagram showing the configuration of an image processing section.

The image processing section 3 removes noises from the visible light image Visible input to it and generates an output image Out, preserving edges of the visible light image Visible. FIG. 3 is a schematic block diagram showing the configuration of the image processing section 3. The image processing section 3 includes a gain adjustment section 31 for adjusting the gain of the visible light image Visible, a low pass filter 33 for removing noises from the visible light image Visible, a high pass filter 34 for extracting edges and details of the infrared image Infr and an image synthesizing section 35 for synthetically combining base image Base, which is the output image of the low pass filter 33, and detail image Edge, which is the output image of the high pass filter 34.

The gain adjustment section 31 boosts the pixel values of the visible light image Visible that may be an underexposed dark image to make it show pixel values close to those of a correctly exposed image. Techniques that can be used for gain adjustment include one that multiplies pixel values of the visible light image by a constant and one that involves the use of gamma correction based on an exponential function or some other correction based on a polynominal function. The maximum value is limited for the pixels after adjustment.

Figure 4:
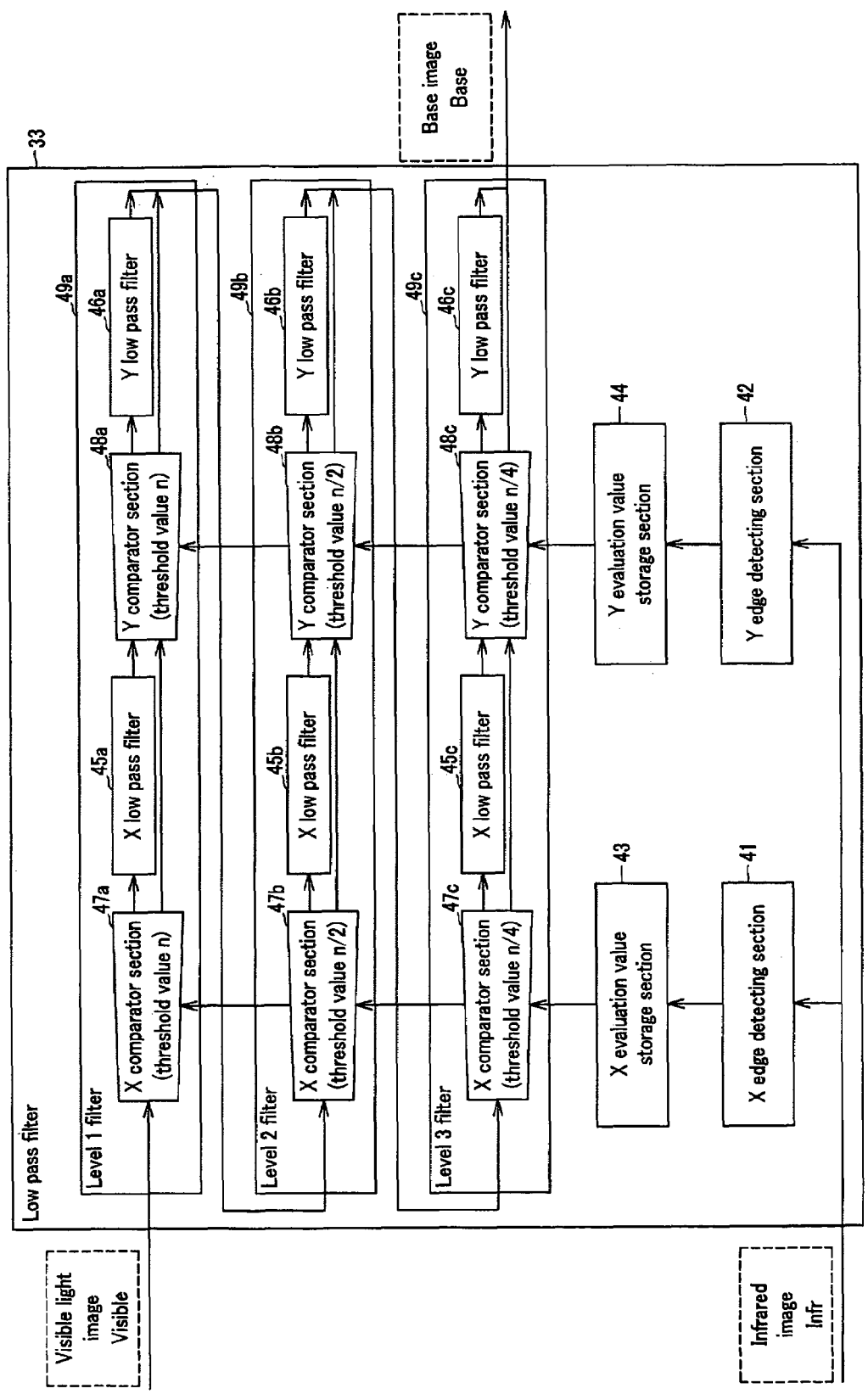
FIG. 4 is a schematic block diagram showing the configuration of a low pass filter.

FIG. 4 is a schematic block diagram showing the configuration of the low pass filter 33. The low pass filter 33 includes an X edge detecting section 41 for detecting edges in the X-direction (transversal direction) of the infrared image Infr, a Y edge detecting section 42 for detecting edges in the Y-direction (longitudinal direction) of the infrared image Infr, an X evaluation value storage section 43 for storing the edge evaluation value of the X-direction, a Y evaluation value storage section 44 for storaging the edge evaluation value of the Y-direction, three X low pass filters 45a, 45b, 45c for removing edges in the X-direction, three low pass filters 46a, 46b, 46c for removing edges in the Y-direction, three X comparator sections 47a, 47b, 47c for comparing the X edge evaluation value with threshold values and three Y comparator sections 48a, 48b, 48c for comparing the Y edge evaluation value with threshold values.

The X low pass filters are FIR low pass filters with 5×1 taps in the X-direction. Noises are removed in the X-direction from the visible light image by the X low pass filters. The Y low pass filters are FIR low pass filters with 1×5 taps in the Y-direction. Noises are removed in the Y-direction from the visible light image by the Y low pass filters.

The X edge detecting section 41 is an FIR filter with 4×4 taps for detecting edges in the X-direction. The Y edge detecting section 42 is an FIR filter with 4×4 taps for detecting edges in the Y-direction. The X value storage section 43 computationally determines an edge evaluation value by applying absolute value computations to the filtering outcome of the X edge detecting section 42 and stores the value as X edge image. The Y value storage section 44 computationally determines an edge evaluation value by applying absolute value computations to the filtering outcome of the Y edge detecting section 43 and stores the value as Y edge image.

The X comparator sections 47 and the Y comparator sections 48 compare the respective edge evaluation values with predetermined threshold values. Threshold value n is equal to ½ of the largest possible edge evaluation value. The X comparator section 47a compares the edge evaluation value in the X-direction with the threshold value n and the X comparator section 47b compares the edge evaluation value in the X-direction with threshold value n/2, whereas the X comparator section 47c compares the edge evaluation value in the X-direction with threshold value n/4. Similarly, the Y comparator section 48a compares the edge evaluation value in the Y-direction with the threshold value n and the Y comparator section 48b compares the edge evaluation value in the Y-direction with threshold value n/2, whereas the Y comparator section 48c compares the edge evaluation value in the Y-direction with threshold value n/4.

The low pass filter 33 is a three-stage filter including three filters for three different levels including a level 1 filter 49a, a level 2 filter 49b and a level 3 filter 49c. The level of the low pass filter 33 depends on the magnitudes of the threshold values of the X comparator sections 47 and the Y comparator sections 48. The low pass filter for the threshold value n, the low pass filter for the threshold value n/2 and the low pass filter for the threshold value n/4 are respectively referred to as level 1 filter 49a, level 2 filter 49b and level 3 filter 49c.

The visible light image Visible is firstly output to the X comparator section 47a. The X comparator section 47a compares the edge evaluation value in the X-direction stored in the X evaluation value storage section 43 with the threshold value n. The X comparator section 47a outputs the visible light image Visible to the X low pass filter 45a when the edge evaluation value is smaller than the threshold value n but it outputs the visible light image Visible to the Y comparator section 48a when the edge evaluation value is not smaller than the threshold value n. The Y comparator section 48b compares the edge evaluation value in the Y-direction stored in the Y evaluation value storage section 44 with the threshold value n. The Y comparator section 48a outputs the visible light image Visible to the Y low pass filter 46a when the edge evaluation value is smaller than the threshold value n but it outputs the visible light image Visible to the next X comparator section 47b when the edge evaluation value is not smaller than n.

Similarly, the X comparator section 47b, the Y comparator section 46b, the X comparator section 47c and the Y comparator section 48c compare the edge evaluation value with the respective threshold values and outputs the visible light image Visible to the immediately downstream low pass filter when the edge evaluation value is smaller than the respective threshold values but they output the visible light image Visible to the next comparator section when the edge evaluation value is not smaller than the respective threshold values.

Figure 5:
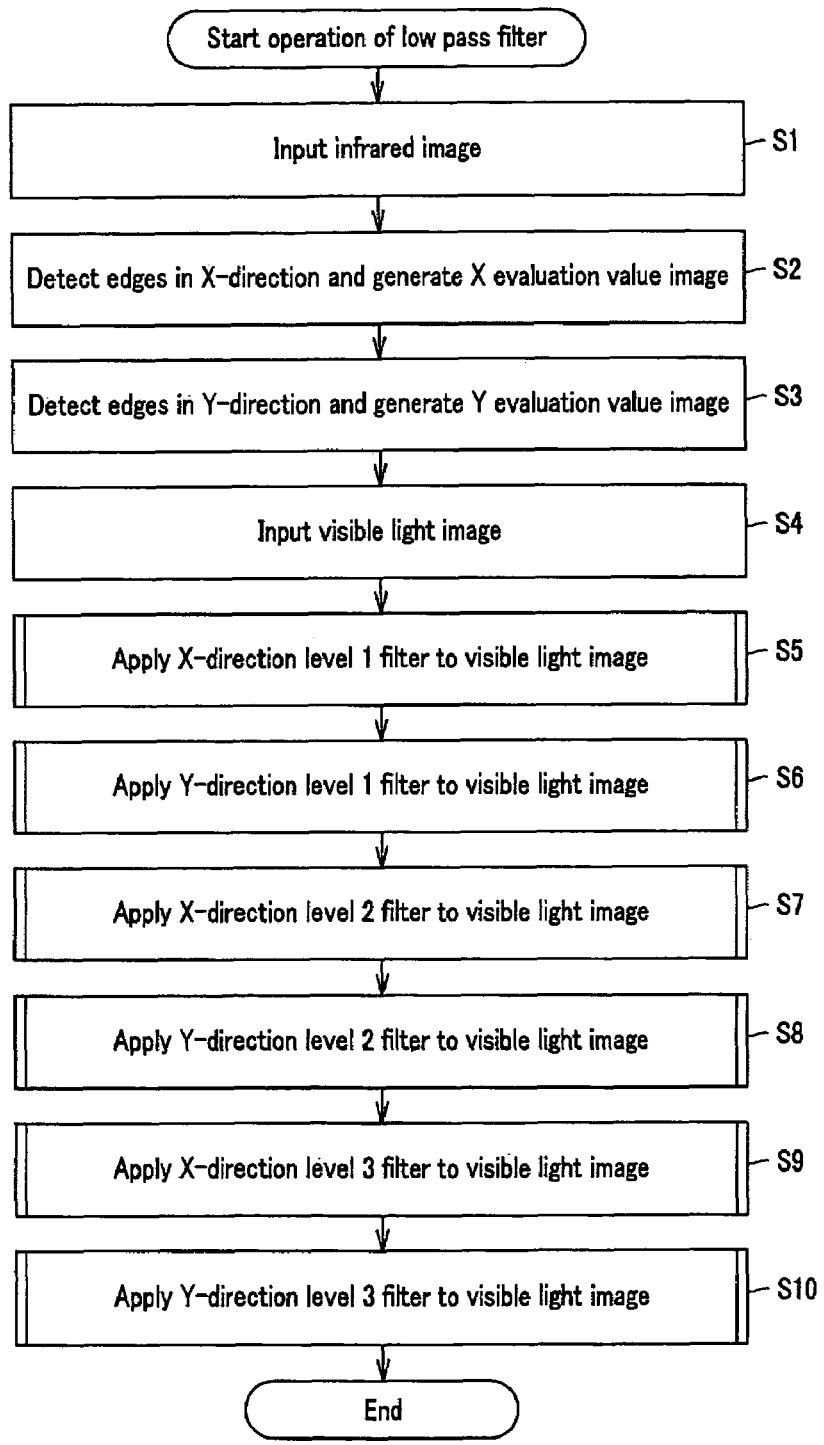
FIG. 5 is a flowchart of operation of the low pass filter.

FIG. 5 is a flowchart of operation of the low pass filter 33. The low pass filter 33 firstly inputs the infrared image Infr (Step S1). The X edge detecting section 41 detects edges that are found in the X-direction in the infrared image Infr. The X evaluation value storage section 43 computationally determines the edge evaluation value in the X-direction by applying predetermined absolute value computations to the edges detected in the X-direction and stores the computationally determined edge evaluation value as X edge image (Step S2). Then, the Y edge detecting section 42 detects edges that are found in the Y-direction in the infrared image Infr. The Y evaluation value storage section 44 computationally determines the edge evaluation value in the Y-direction by applying predetermined absolute value computations to the edges detected in the Y-direction and stores the computationally determined edge evaluation value as Y edge image (Step S3).

The low pass filter 33 inputs the visible light image Visible from the gain adjustment section 31 (Step S4). The low pass filter 33 then applies the input visible light image Visible to the level 1 filter 49a for a process in the X-direction (Step S5).

Figure 6:
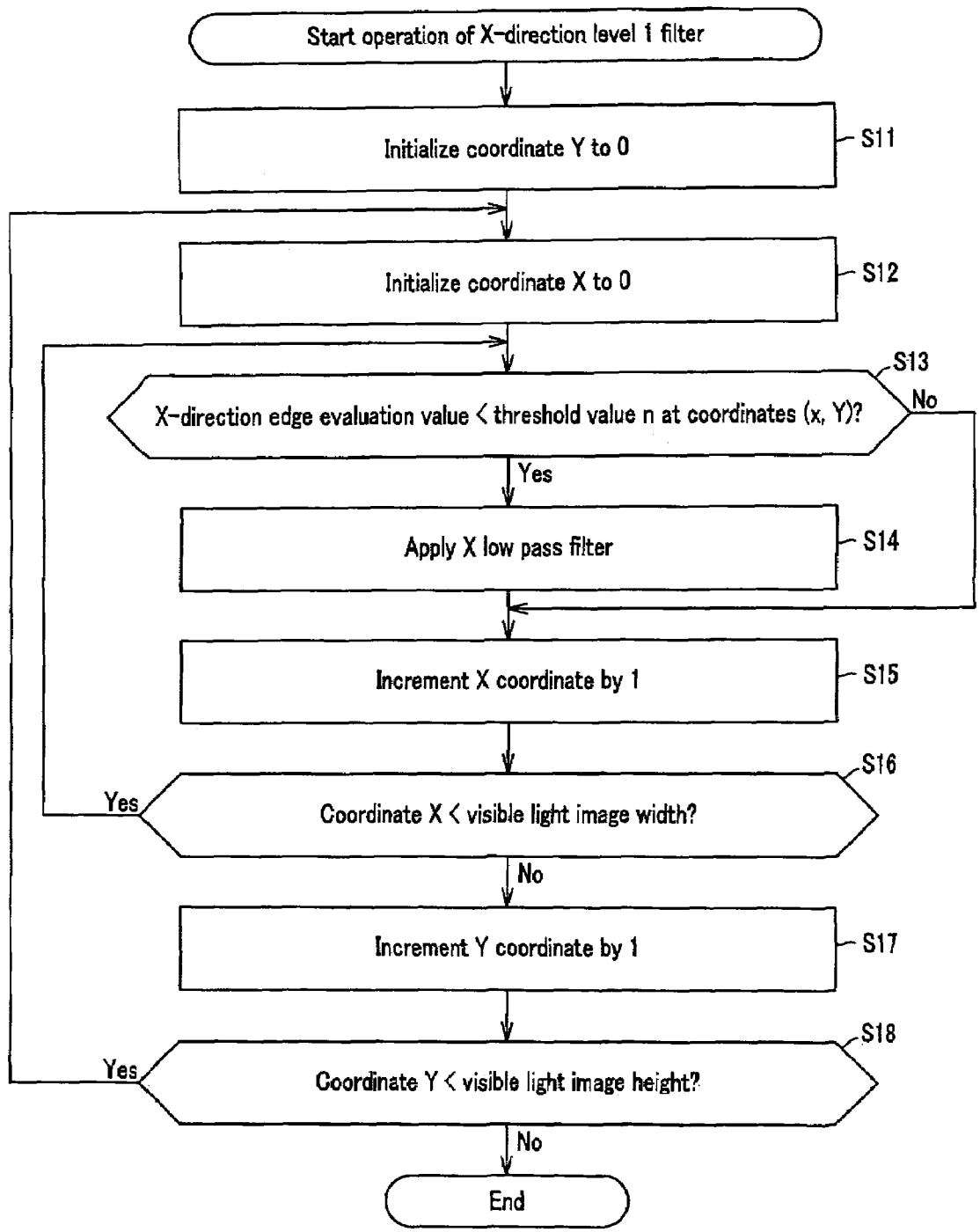
FIG. 6 is a flowchart of operation of a level 1 filter in the X-direction.

FIG. 6 is a flowchart of the process of the level 1 filter 49a in the X-direction. In the process of the level 1 filter 49a in the X-direction, the level 1 filter 49a firstly initializes the coordinate Y in the Y-direction to 0 (Step S11) and also initializes the coordinate X in the X-direction to 0 (Step S12). The X comparator section 47a inputs the X evaluation value image from the X evaluation value storage section 43. Then, the X comparator section 47a compares the edge evaluation value in the X-direction at the coordinates (X, Y) of the X evaluation value image with the threshold value n. If the edge evaluation value at the coordinates (X, Y) is smaller than the threshold value n (Step S13; YES), it applies the X low pass filter 45a to the visible light image at the coordinates (X, Y) (Step S14). On the other hand, if the edge evaluation value at the coordinates (X, Y) is smaller than the threshold value (Step S13; NO), the process proceeds to Step S15. The level 1 filter 49a increments the value of the X-coordinate by 1 in Step S15. It then compares the value of the X-coordinate with the width of the visible light image Visible. If the X-coordinate is smaller than the width of the visible light image Visible (Step S16; YES), the process returns to Step S13. On the other hand, if the X-coordinate is not larger than the width of the visible light image Visible (Step S16; NO), the level 1 filter 49a increments the value of the Y-coordinate by 1 (Step S17). The level 1 filter 49a compares the value of the Y-coordinate with the height of the visible light image Visible in Step S18. If the Y-coordinate is smaller than the height of the visible light image Visible (Step S18; YES), the process returns to Step S12. On the other hand, if the Y-coordinate is not smaller than the height of the visible light image Visible (Step S18; NO), the level 1 filter 49a ends the process in the X-direction. The level 1 filter compares the edge evaluation value consisting the visible image with the threshold value n. If the edge evaluation value is smaller than the threshold value n, it removes noises in the X-direction by applying the X low pass filter 45a.

When the process by the level 1 filter 49a in the X-direction is completed in the level 1 filter, another process is executed by the level 1 filter 49a in the Y-direction. This process is substantially the same as the process by the level 1 filter 49a in the X-direction illustrated in FIG. 6. The level 1 filter 49a in the Y-direction uses the Y edge image instead of the X edge image as image to be evaluated and the Y low pass filter 46a instead of the X low pass filter 45a as low pass filter (Step S6).

As the level 1 filter 49a completes its own process, it outputs the visible light image Visible to the level 2 filter 49b. The level 2 filter 49b executes a process in the X-direction (Step S7). As it completes the process in the X-direction, it then executes another process in the Y-direction (Step S8). As the level 3 filter 49c receives the output image of the level 2 filter 49b, it executes a process in the X-direction (Step S9) and, as it completes the process in the X-direction, it executes another process in the Y-direction (Step S10). The processes executed by the level 2 filter and the level 3 filter are the same except that the two filters use different respective threshold values.

The number of times of filtering operations that the low pass filter 33 carries out is large for pixels showing a low edge evaluation value and small for pixels showing a high edge evaluation value. In other words, an edge is preserved at a pixel having a large evaluation value because of the small number of filtering operations carried out there, whereas a noise is removed at a pixel having a small evaluation value because of the large number of filtering operations carried out there. A filter having such a functional feature is referred to as edge preservation filter. In terms of the types of edge preservation filters, there are bilateral filters and cross bilateral filters besides those illustrated in FIG. 4. Any of these filters may be used for the low pass filter 33.

The low pass filter 33 outputs an image obtained by removing noises from the visible light image Visible. This image is referred to as base image Base. The base image Base provides an advantage that the color tone of the image is correct and a disadvantage that the details of edges are not clear and gives an impression of a blurred image.

Figure 7:
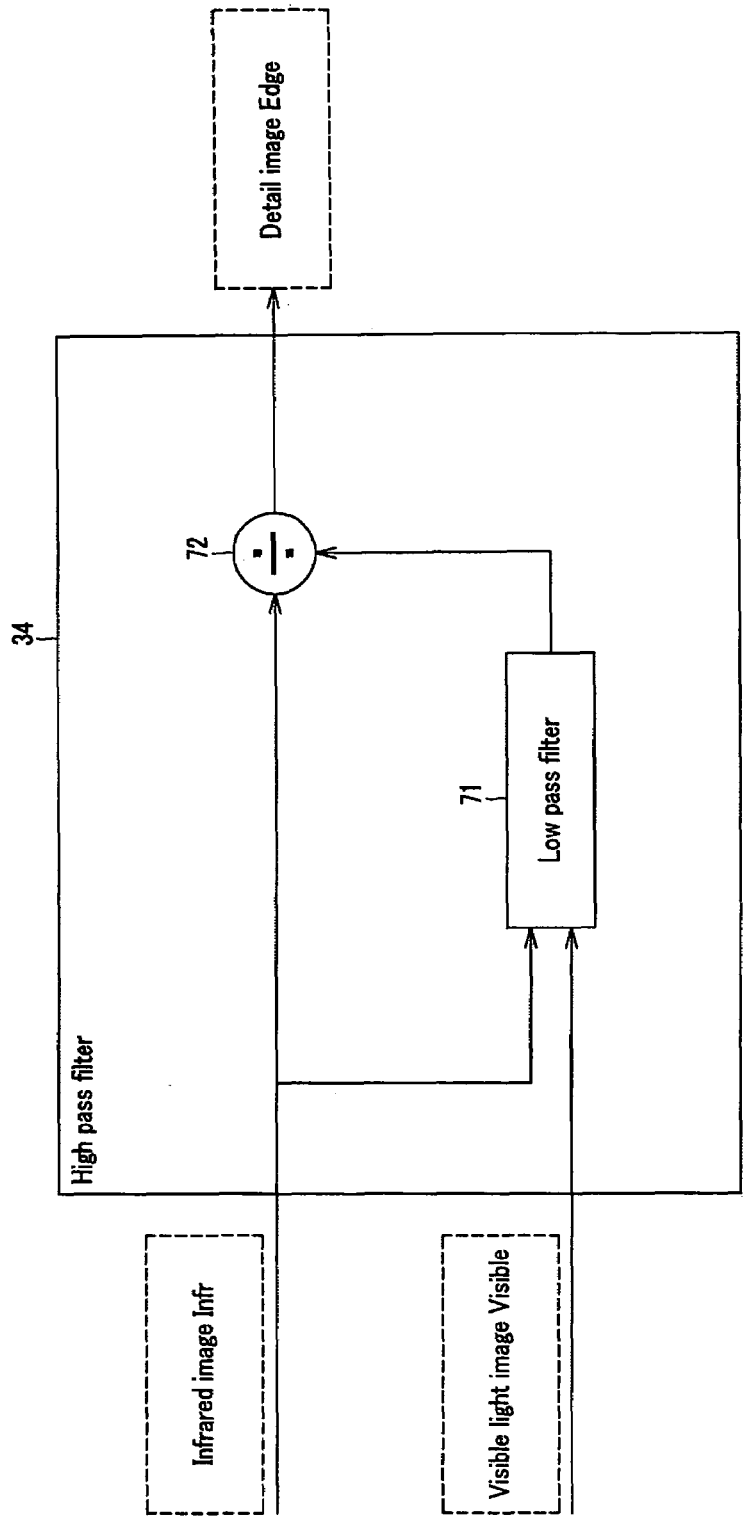
FIG. 7 is a schematic block diagram showing the configuration of a high pass filter.

The high pass filter 34 extracts edges of the infrared image Infr. FIG. 7 is a schematic block diagram of the high pass filter 34, showing a typical configuration thereof. The high pass filter 34 in FIG. 7 is a two-dimensional FIR filter. The high pass filter 34 is formed by using a low pass filter 71 and a division section 72. The low pass filter 71 is typically an edge preservation type low pass filter. The low pass filter 71 removes noises from the visible light image Visible and outputs the obtained image to the division section 72. The division section 72 divides the infrared image Infr by the output of the low pass filter 71 and extracts the high pass components of the infrared image Infr. The image output from the high pass filter 34 preserves the edges and the details of the infrared image Infr. This image is referred to as detail image Edge.

The image synthesizing section 35 generates a synthetic image by multiplying the base image Base by the detail image Edge. This image is the output image OUT of the image processing section 3. The output image OUT has the advantages of the base image Base and those of the detail image Edge and is characterized in that it provides the correct color tone and clearly shows details.

As described above, the image pickup apparatus 1 of this embodiment provides an output image OUT by synthetically combining a base image Base obtained by removing noises from a visible light image Visible and a detail image Edge obtained by extracting edges and details of a corresponding infrared image Infr. Thus, the output image OUT is obtained by removing noises from the visible light image Visible and contains edges and details attenuated by the removal of noises.

Since the infrared image Infr can be picked up simultaneously with the visible light image Visible, no time lag arises between the two images and hence the image processing method of the invention can be applied to moving pictures and to operations of picking up a moving subject.

Known image processing apparatus are adapted to extract edges from a flash image so that the cost of arithmetic operations for removing shadows and high lights that can be produced due to differences of lighting conditions between a natural light image and a flash image is enormous. However, according to the present invention, the infrared image Infr can be picked up under lighting conditions same as those of the visible light image Visible. In other words, it is no longer necessary to correct the differences of lighting conditions.

Additionally, known image processing apparatus are accompanied by the problem that the pixels of details are discarded when the apparatus mistakes details and edges for high lights. On the other hand, the infrared image Infr and the visible light image Visible are picked up under the same lighting conditions so that shadows and high lights would not be produced due to differences of lighting conditions and hence no necessary pixels would be discarded.

Now, a first modified image processing section 3 will be described by referring to FIG. 8. This image processing section 50 detects edges by using the luminance of the visible light image Visible. Since luminance has only a single variable, the cost of arithmetic operations for detecting edges will be much less than that of arithmetic operations for detecting edges from the three variables of RGB. Since human beings are generally sensitive to luminance but not to color components, it is sufficiently effective to detect edges by using luminance.

Figure 8:
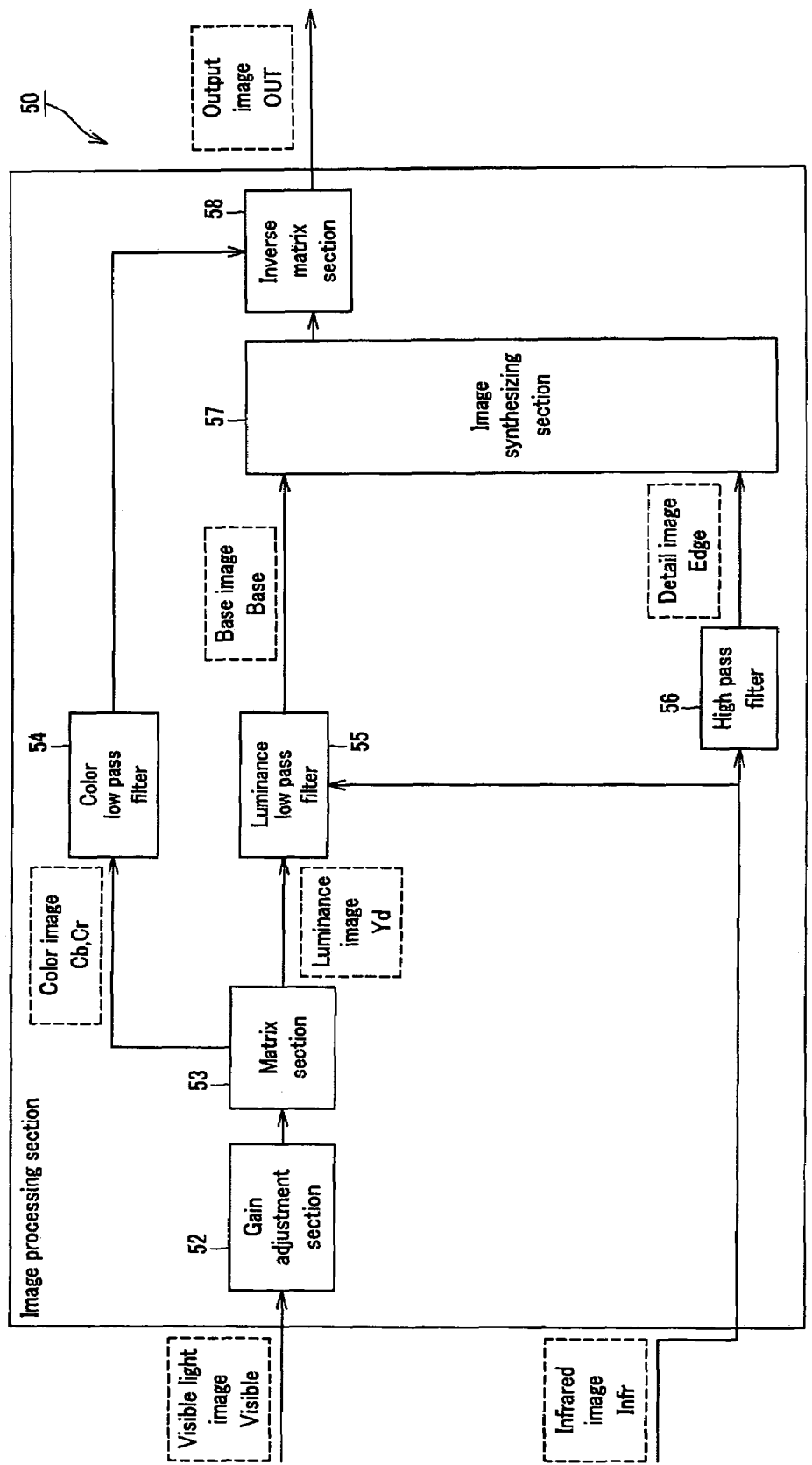
FIG. 8 is a schematic block diagram of a first modified image processing section.

FIG. 8 is a schematic block diagram of the image processing section 50. The image processing section 50 includes a gain adjustment section 52, a matrix section 53, a color low pass filter 54, a luminance low pass filter 55, a high pass filter 56, an image synthesizing section 57 and an inverse matrix section 58.

The gain adjustment section 52 boosts the pixel values of the visible light image Visible that may be an underexposed dark image to make it show pixel values close to those of a correctly exposed image. Techniques that can be used for gain adjustment include one that multiplies pixel values of the visible light image by a constant and one that involves the use of gamma correction based on an exponential function or some other correction based on a polynominal function. The maximum value is limited for the pixels after adjustment.

The matrix section 53 transforms an RGB image into color images Cb, Cr and a luminance image Yd by means of matrix transformation of the RGB image. The color low pass filter 54 removes noises from the color images Cb, Cr. A bilateral filter may typically be used for the color low pass filter 54. A bilateral filter can detect edges and remove noises from a single image.

The luminance low pass filter 55 removes noises from the luminance image Yd. A cross bilateral filter may typically be used for the luminance low pass filter 55. A cross bilateral filter can remove noises from the image that is the object of filtering while preserving the edges detected from the image used for detecting edges. The luminance low pass filter 55 detects edges from an infrared image Infr and removes noises from the luminance image Yd. The image output from the luminance low pass filter 55 is referred to as base image Base. The base image Base has an advantage that the luminance of the image is correct and a disadvantage that it can give an impression of a blurred image because edges and details are not clear.

The high pass filter 56 extracts edges from the infrared image Infr. The image output from the high pass filter 56 preserves edges and details of the infrared image Infr. This image is referred to as detail image Edge.

The image synthesizing section 57 generates a synthetic image by multiplying the base image Base by the detail image Edge. This synthetic image has the advantages of the base image Base and those of the detail image Edge and is characterized in that it provides the correct luminance and clear details and edges. The inverse matrix section 58 transforms the luminance image into an RGB image by means of inverse matrix transformation of the synthetic image. This image is the output image OUT of the image processing section.

The image processing section 50 produces color images Cr, Cb and a luminance image Yd by transforming the RGB image and detects edges only from the luminance image Yd. Since human beings are generally sensitive to luminance but not to color components, it is sufficiently effective to detect edges by using luminance. Since luminance has only a single variable, the cost of arithmetic operations for detecting edges will be much less than that of arithmetic operations for detecting edges from the three variables of RGB.

Figure 9:
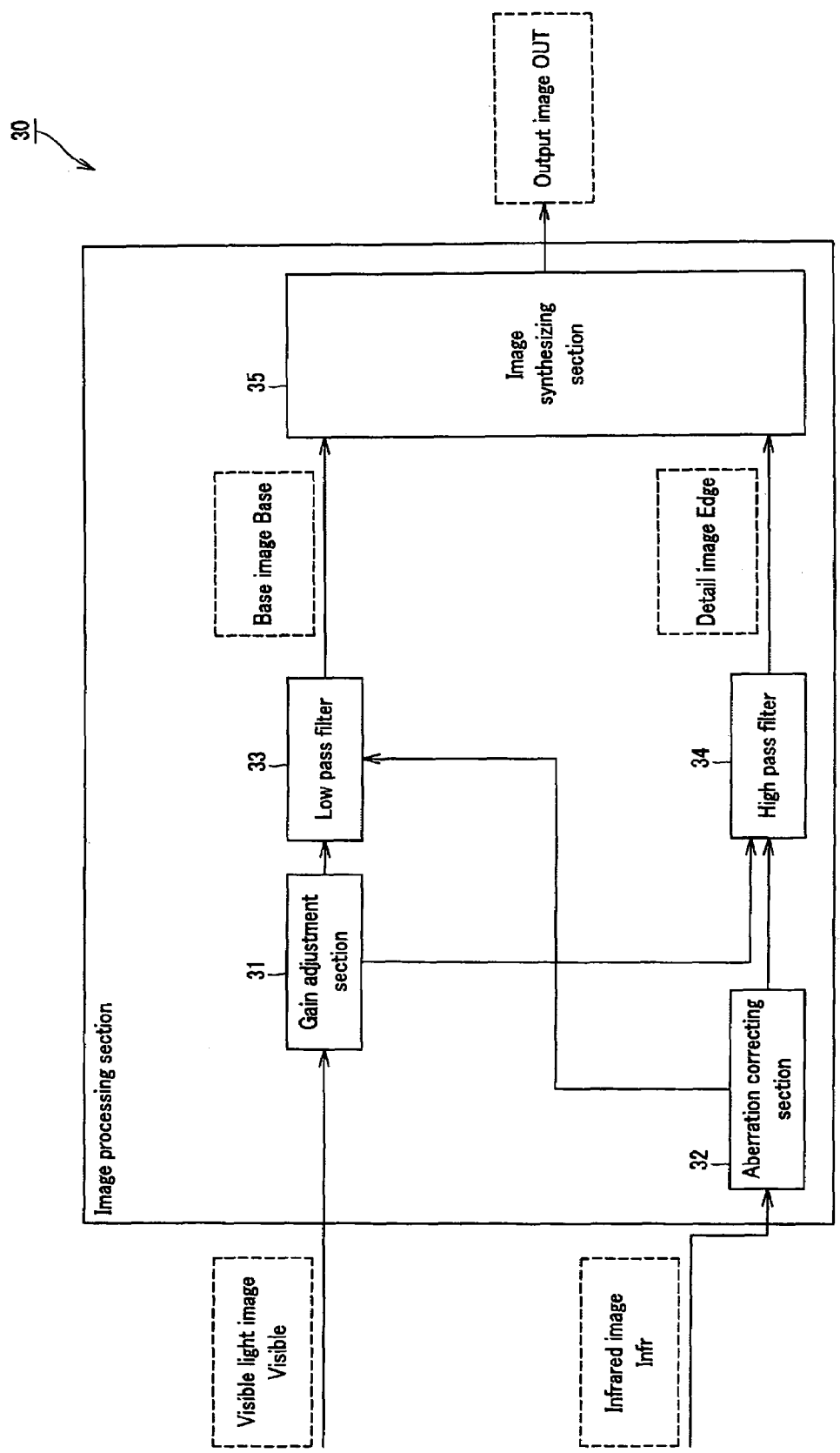
FIG. 9 is a schematic block diagram of a second modified image processing section.

Now, a second modified image processing section 3 will be described by referring to FIG. 9. As shown in FIG. 9, this image processing section 30 includes an aberration correcting section 32 for correcting the aberration of an infrared image. The configuration of the image processing section 30 is same as that of the image processing section 3 except that the former includes an aberration correcting section 32. Therefore, the components same as those of the image processing section 3 will be denoted by the same reference symbols respectively and will not be described any further.

Figure 10:
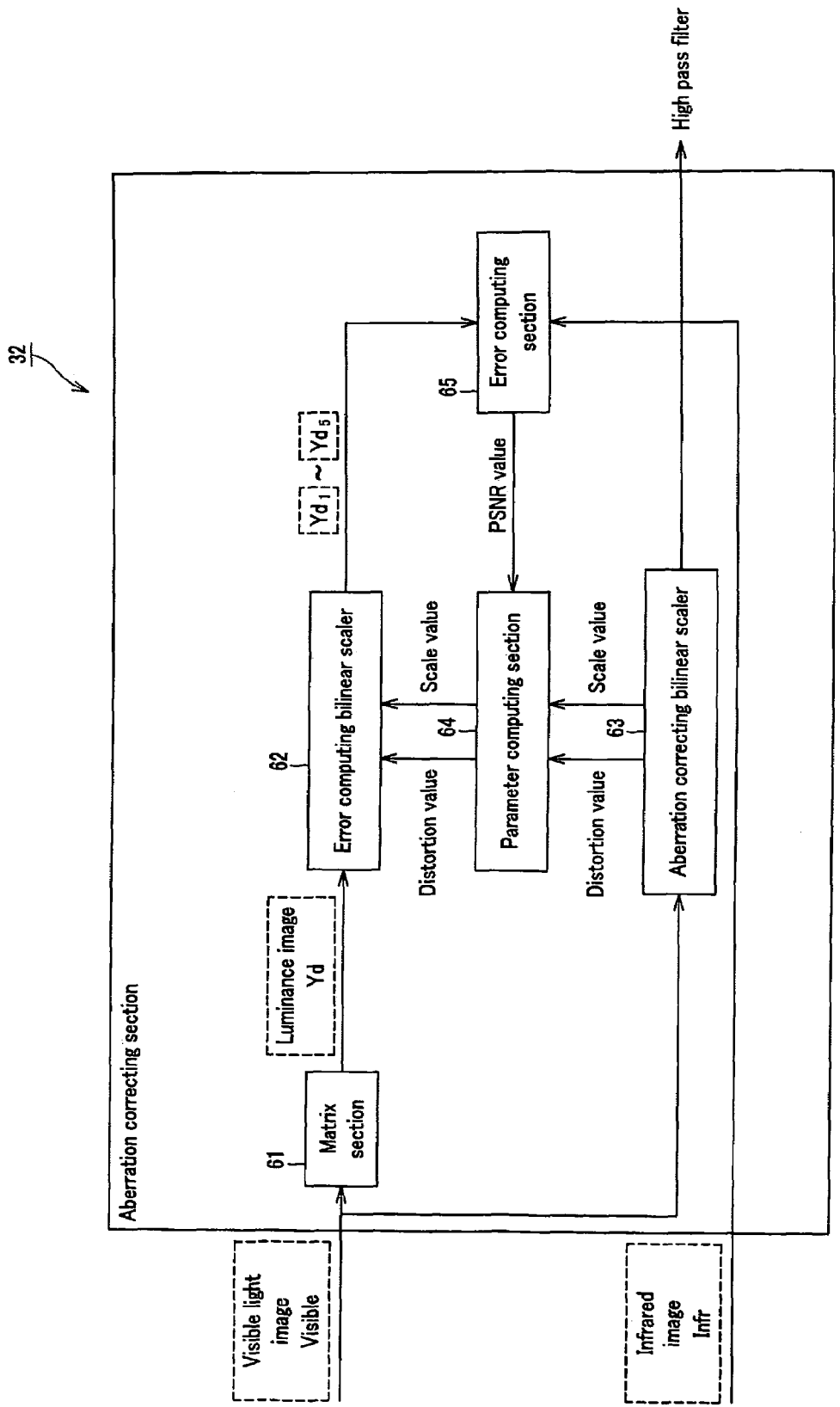
FIG. 10 is a schematic block diagram showing the configuration of an aberration correcting section.

The aberration correcting section 32 corrects the aberration that is produced due to the difference of wavelength between infrared rays and rays of visible light. FIG. 10 shows a configuration of the aberration correcting section 32. The aberration correcting section 32 includes a matrix section 61, an error computing bilinear scaler 62, an aberration correcting bilinear scaler 63, a parameter computing section 64 and an error computing section 65.

The matrix section 61 generates a luminance image Yd from the input visible light image Visible. The error computing bilinear scaler 62 generates five different scale transformation images and distortion transformation images on the basis of the scale values and the distortion values output from the parameter computing section 64.

The error computing section 65 compares the scale transformation images and the infrared image and the distortion transformation images and the infrared image and computes the error values of the images. The error values are PSNR values (peak signal to noise ratio). The parameter computing section 64 optimizes the scale values and the distortion values by referring to the PSNR values computed by the error computing section 65. The aberration correcting bilinear scaler 63 corrects the aberration of the visible light image Visible, using the scale value and the distortion value optimized by the parameter computing section 64.

Figure 11:
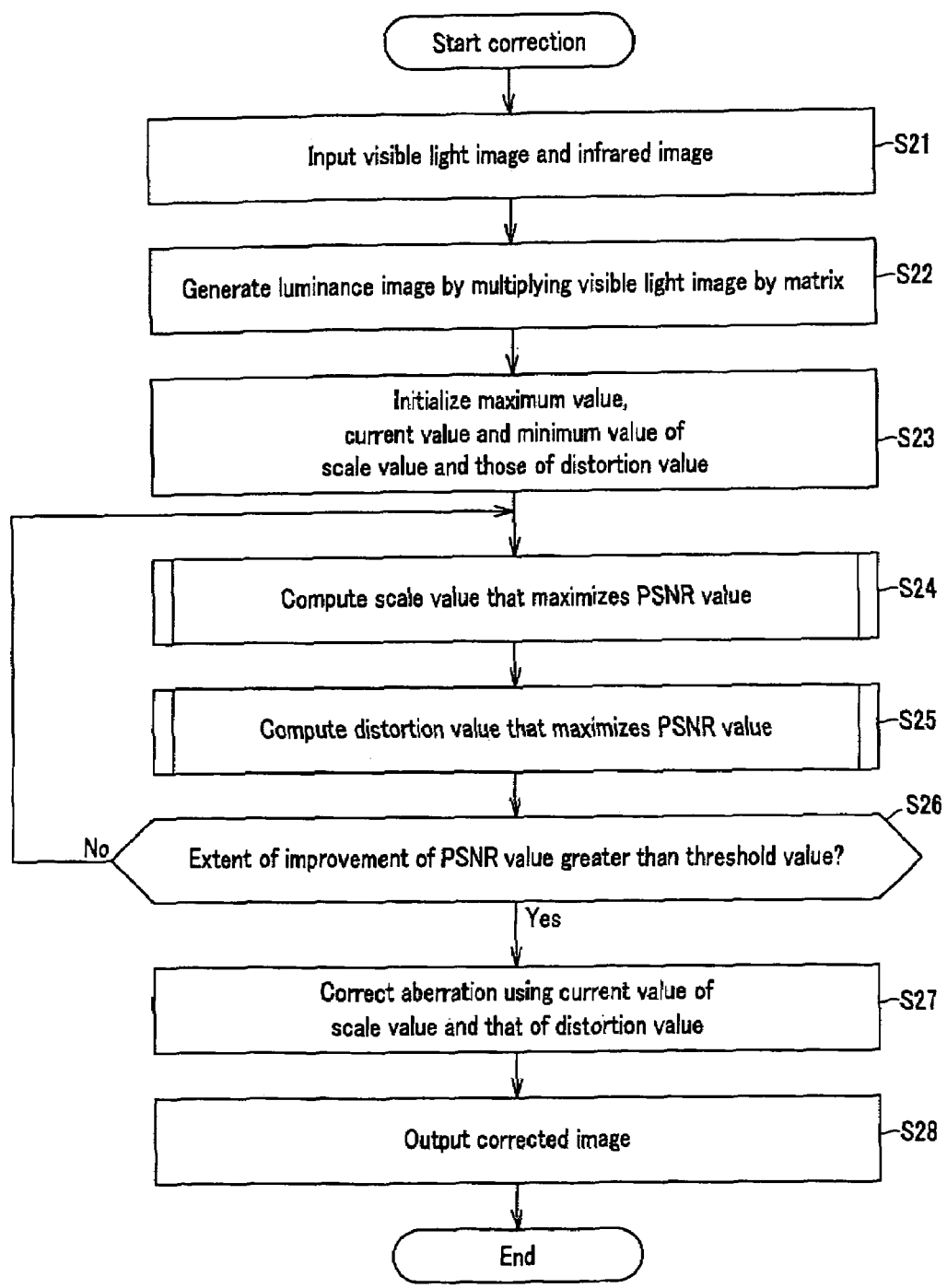
FIG. 11 is a flowchart of operation of the aberration correcting section.

FIG. 11 is a flowchart of operation of the aberration correcting section 32. The aberration correcting section 32 inputs the visible light image Visible and the infrared image Infr. The visible light image Visible is an RGB image (Step S21). The matrix section 61 multiplies the visible light image Visible by a matrix to generate a luminance image Yd (Step S22). The parameter computing section 64 initializes the maximum value, the current value and the minimum value of the scale value and the maximum value, the current value and the minimum value of the distortion value (Step S23).

The parameter computing section 64 inputs the PSNR values from the error computing section 65 and determines the scale value that maximizes the PSNR values (Step S24).

Figure 12:
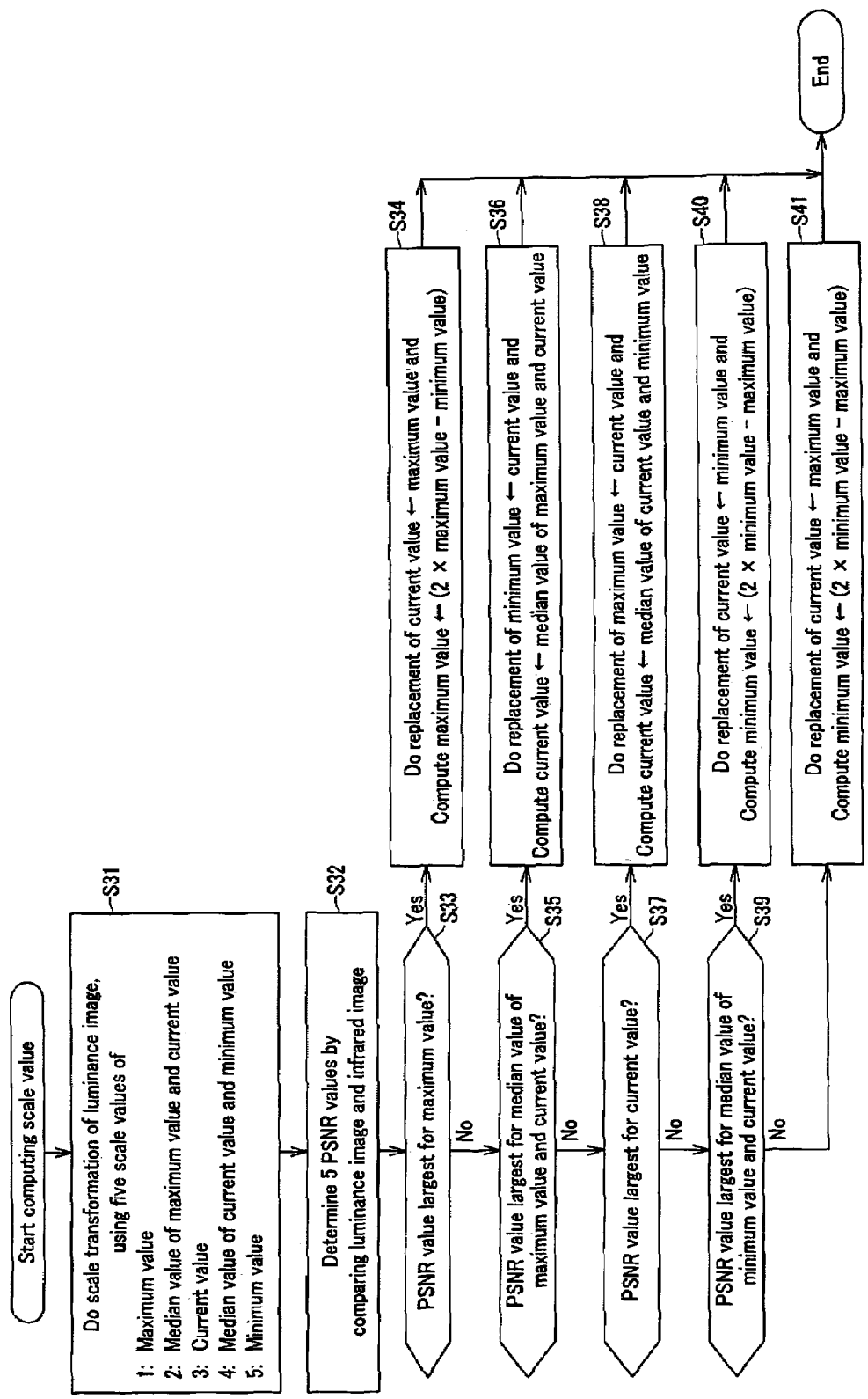
FIG. 12 is a flowchart of a scale value computing process of the aberration correcting section.

FIG. 12 is a flowchart of the scale value computing process. The parameter computing section 64 prepares five parameters including the maximum value S1 of the scale value, the median value S2 of the maximum value and the current value, the current value S3, the median value S4 of the minimum value and the current value and the minimum value S5. The error detecting bilinear scaler 62 carries out a scale transformation of the luminance image Yd, using the five scale values. As a result, five luminance images Yd1 through Yd5 are generated to correspond to the five parameters (Step S31).

The error computing section 65 compares the luminance images Yd1 through Yd5 and the infrared image Infr to determine five PSNR values (Step S32). If the PSNR value of the luminance image Yd1 generated by the scale transformation, using the maximum value S1 and that of the infrared image Infr, are largest (Step S33; YES), the parameter computing section 64 replaces the current value S3 with the maximum value S1 and the maximum value S1 with the value obtained by doubling the maximum value S1 and subtracting the minimum value S5 from the doubled maximum value S1 (Step S34).

If the PSNR value is largest for the median value of the maximum value S1 and the current value S3 (Step S35; YES), the parameter computing section 64 replaces the maximum value S5 with the current value S3 and the current value S3 with the median value of the maximum value S1 and the current value S3 (Step S36).

If the PSNR value is largest for the current value S3 (Step S37; YES), the parameter computing section 64 replaces the maximum value S1 with the current value S3 and the current value S3 with the median value of the current value S3 and the minimum value S5 (Step S38).

If the PSNR value is largest for the median value of the minimum value S5 and the current value S3 (Step S39; YES), the parameter computing section 64 replaces the current value S3 with the minimum value S5 and the minimum value S5 with the value obtained by doubling the maximum value S5 and subtracting the maximum value S1 from the doubled minimum value S5 (Step S40).

If the PSNR value is largest for the minimum value S5 (Step S33, Step S35, Step S37, Step S39; NO), the parameter computing section 64 replaces the current value S3 with the minimum value S5 and the minimum value S5 with the value obtained by doubling the minimum value S5 and subtracting the maximum value S5 from the doubled minimum value S5 (Step S41). In this way, the process of optimizing the scale value is completed.

Then, the parameter computing section 64 optimizes the distortion value. The process of optimizing a distortion value is identical with the process of optimizing a scale value. To begin the process of optimizing the distortion value, parameters are converted from scale values to distortion values (Step S25). As the process of optimization of scale values and distortion values is completed, the parameter computing section 64 compares the extent of improvement of the PSNR value with a predetermined threshold value. If the extent of improvement of the PSNR value is not greater than a predetermined threshold value (Step S26; NO), the processing operation returns to Step S25 to repeat the process of optimizing the scale value and the distortion value.

If, on the other hand, the extent of improvement is greater than the predetermined threshold value (Step S26; YES), the parameter computing section 64 outputs the current scale value and distortion value to the aberration correcting bilinear scaler 63. The aberration correcting bilinear scaler 63 corrects the aberration of the visible light image Visible, using the current scale value and distortion value (Step S27), and outputs the corrected image to the high pass filter 56 (Step S28).

Due to the provision of the aberration correcting section 32, it is now possible to correct the difference of aberration that is produced by the difference of wavelength between rays of visible light and infrared rays. As a result, the image picked up as visible light image Visible and the image picked up as infrared image Infr agree with each other.

Generally, the refractive index of infrared rays is high and expanded to a slight extent. A large image is obtained by correcting the visible light image Visible so that the distortion of the image will also be boosted. Since there is a tradeoff between the size and the distortion of an image, the corrected image may be different depending on if priority is given to size or to distortion.

The filtering process and the aberration correcting process of the image processing section 3 may be executed according to a control program. Such a control program may be recorded on the firmware of the image pickup apparatus 1. Alternatively, the external recording apparatus 10 may acquire the control program that is recorded in a recording medium in a form readable to the external recording apparatus 10. Recording mediums that can be used for recording the control program include those that operate with a magnetic reading system (e.g., magnetic tapes, flexible discs, magnetic cards), those that operate with an optical reading system (e.g., CD-ROMs, MOs, CD-Rs, DVDs) and semiconductor memories (e.g., memory cards, IC cards). The control program may be acquired by way of the Internet or some other network.

It should be understood by those skilled in the art that various modifications, combinations, sub-combinations and alterations may occur depending on design requirements and other factors insofar as they are within the scope of the appended claims and the equivalents thereof.

What is claimed is:

1. An image processing apparatus comprising:
   image acquisition means for acquiring a visible light image and an invisible light image corresponding to the visible light image;
   first filtering means for applying a low pass filter to the visible light image, a filter level of the low pass filter being selected independently in the X-direction and the Y-direction of the visible light image according to an evaluation value of edges detected from the invisible light image;
   second filtering means for applying a high pass filter to the invisible light image;
   synthesis means for synthetically combining the output of the low pass filter and the output of the high pass filter to create a noise-reduced visible light image; and
   displaying means for displaying the noise-reduced visible light image on a display.

2. The apparatus according to claim 1, wherein the invisible light image is an infrared image.

3. The apparatus according to claim 1, wherein the invisible light image is an ultraviolet image.

4. The apparatus according to claim 1, wherein the low pass filter is an edge preserving low pass filter.

5. The apparatus according to claim 4, wherein the edge preserving low pass filter removes noises from the visible light image, while preserving the edges detected from the invisible light image.

6. The apparatus according to claim 1, wherein the visible light image is transformed into a color image and a luminance image and filters are applied respectively to the color image and the luminance image obtained as a result of transformation.

7. The apparatus according to claim 6, wherein a bilateral filter is applied to the color image and a cross bilateral filter is applied to the luminance image.

8. The apparatus according to claim 1, further comprising:
   aberration correction means for correcting the aberration of the visible light image and that of the invisible light image.

9. The apparatus according to claim 8, wherein the aberration correction means correct the aberrations, using the error between the luminance image obtained by transforming the visible light image and the invisible light image.

10. An image pickup apparatus comprising:
    visible light image pickup means for picking up a visible light image according to a first spectral characteristic of having sensitivity mainly relative to visible light;
    invisible light image pickup means for picking up an invisible light image according to a second spectral characteristic of having sensitivity mainly to invisible light;
    luminance image generating means for generating a luminance image from the visible light image;
    error computing means for computing error values by comparing transformation images of the luminance image with the invisible light image;
    aberration correction means for correcting the aberration of the visible light image and that of the invisible light image based on the computed error values;
    noise reduction means for reducing noises of the visible light image by using the invisible light image; and
    displaying means for displaying the noise-reduced visible light image on a display.

11. An image processing method comprising:
    acquiring a visible light image and an invisible light image corresponding to the visible light image;
    applying a low pass filter to the visible light image, a filter level of the low pass filter being selected independently in the X-direction and the Y-direction of the visible light image according to an evaluation value of edges detected from the invisible light image;
    applying a high pass filter to the invisible light image;
    synthetically combining the output of the low pass filter and the output of the high pass filter to create a noise-reduced visible light image; and
    displaying the noise-reduced visible light image on a display.

12. A computer-readable recording medium storing a computer program for causing a computer to execute a method comprising:
    acquiring a visible light image and an invisible light image corresponding to the visible light image applying a low pass filter to the visible light image,
    applying a low pass filter to the visible light image, a filter level of the low pass filter being selected independently in the X-direction and the Y-direction of the visible light image according to an evaluation value of edges detected from the invisible light image;
    applying a high pass filter to the invisible light image;

synthetically combining the output of the low pass filter and the output of the high pass filter to create a noise-reduced visible light image; and displaying the noise-reduced visible light image on a display.

13. An image pickup apparatus comprising:

a visible light image pickup unit that picks up a visible light image according to the first spectral characteristic of having sensitivity mainly relative to visible light;

an invisible light image pickup unit that picks up an invisible light image according to the second spectral characteristic of having sensitivity mainly to invisible light;

a luminance image generating unit that generates a luminance image from the visible light image;

an error computing unit that computes error values by comparing transformation images of the luminance image with the invisible light image;

an aberration correction unit that corrects the aberration of the visible light image and that of the invisible light image based on the computed error values;

a noise reduction unit that reduces noises of the visible light image by using the invisible light image; and a display unit that displays the noise-reduced visible light image.

* * * * *

UNITED STATES PATENT AND TRADEMARK OFFICE
CERTIFICATE OF CORRECTION

| | | |
|---|---|---|
| PATENT NO. | : 7,589,771 B2 | Page 1 of 1 |
| APPLICATION NO. | : 11/304651 | |
| DATED | : September 15, 2009 | |
| INVENTOR(S) | : Hajime Hosaka | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 917 days.

Signed and Sealed this
Eighth Day of March, 2011

David J. Kappos
*Director of the United States Patent and Trademark Office*